(12) United States Patent
Carlsson et al.

(10) Patent No.: US 11,958,040 B2
(45) Date of Patent: Apr. 16, 2024

(54) CATALYST PREPARATION METHOD

(71) Applicant: JOHNSON MATTHEY PUBLIC LIMITED COMPANY, London (GB)

(72) Inventors: Mikael Carlsson, Billingham (GB); Mark Alexander Kent, Billingham (GB); Stefano Martinuzzi, Billingham (GB); Shanneal Readman, Billingham (GB); John West, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 396 days.

(21) Appl. No.: 17/595,360

(22) PCT Filed: Apr. 30, 2020

(86) PCT No.: PCT/GB2020/051053
§ 371 (c)(1),
(2) Date: Nov. 15, 2021

(87) PCT Pub. No.: WO2020/234561
PCT Pub. Date: Nov. 26, 2020

(65) Prior Publication Data
US 2022/0184582 A1    Jun. 16, 2022

(30) Foreign Application Priority Data

May 20, 2019    (GB) ...................................... 1907062

(51) Int. Cl.
*B01J 23/02* (2006.01)
*B01J 6/00* (2006.01)
(Continued)

(52) U.S. Cl.
CPC ............... *B01J 23/02* (2013.01); *B01J 6/001* (2013.01); *B01J 23/755* (2013.01); *B01J 35/397* (2024.01);
(Continued)

(58) Field of Classification Search
CPC ... B01J 6/001; B01J 21/04; B01J 23/00; B01J 23/02; B01J 23/04; B01J 23/06;
(Continued)

(56) References Cited

U.S. PATENT DOCUMENTS 4,317,746 A    3/1982  Richardson
4,329,530 A    5/1982  Irvine et al.
(Continued)

FOREIGN PATENT DOCUMENTS

CN    102413923 A    4/2012
JP    2-75344 A    3/1990
(Continued)

*Primary Examiner* — Brian A McCaig
(74) *Attorney, Agent, or Firm* — BakerHostetler

(57) ABSTRACT

A method is described for preparing an eggshell catalyst comprising the steps of: (i) preparing a calcined shaped alkaline earth metal aluminate catalyst support, (ii) treating the calcined shaped alkaline earth metal aluminate support with a gas containing water vapour to form a hydrated support, (iii) with or without an intervening drying step, impregnating the hydrated support with an acidic solution containing one or more catalytic metal compounds and drying the impregnated support, (iv) calcining the dried impregnated support, to form a calcined catalyst having a catalytic metal oxide concentrated at the surface of the support and (v) optionally repeating steps (ii), (iii) and (iv).

24 Claims, 1 Drawing Sheet

(51) Int. Cl.
  *B01J 23/755* (2006.01)
  *B01J 35/30* (2024.01)
  *B01J 37/02* (2006.01)

(52) U.S. Cl.
  CPC ....... *B01J 37/0207* (2013.01); *B01J 37/0236* (2013.01)

(58) Field of Classification Search
  CPC . B01J 23/26; B01J 23/34; B01J 23/755; B01J 23/78; B01J 35/397; B01J 37/0063; B01J 37/02; B01J 37/0207; B01J 37/0213; B01J 37/0236; B01J 37/088; B01J 37/10; B01J 37/14; B01J 37/18; C01B 3/40; C01B 2203/1058
  See application file for complete search history.

(56) References Cited

U.S. PATENT DOCUMENTS

| | | |
|---|---|---|
| 4,707,351 A | 11/1987 | Lord et al. |
| 4,988,661 A | 1/1991 | Arai et al. |
| 7,176,159 B1 | 2/2007 | Wheelock |
| 7,879,224 B2 | 2/2011 | Euzen et al. |
| 9,393,552 B2 | 7/2016 | Skjøth-Rasmussen et al. |
| 9,981,252 B2 | 5/2018 | Carlsson et al. |
| 2006/0009353 A1 | 1/2006 | Cai |
| 2012/0135860 A1 | 5/2012 | Carlsson et al. |
| 2013/0281289 A1 | 10/2013 | Forrest et al. |
| 2015/0080212 A1 | 3/2015 | Skjoth-Rasmussen et al. |
| 2018/0036717 A1 | 2/2018 | Cabiac et al. |

FOREIGN PATENT DOCUMENTS

| | | |
|---|---|---|
| JP | 2008-513209 A | 5/2008 |
| JP | 2009-23848 A | 2/2009 |
| RU | 1780208 A1 | 11/1995 |
| RU | 2012144371 A | 4/2014 |
| WO | 2010/029323 A1 | 3/2010 |
| WO | 2010/029324 A1 | 3/2010 |
| WO | 2010/125369 A2 | 11/2010 |
| WO | 2011/113611 A2 | 9/2011 |
| WO | 2012/056211 A1 | 5/2012 |

CATALYST PREPARATION METHOD

This invention relates to a method of preparing eggshell catalysts on alkaline earth metal aluminate supports.

Eggshell catalysts, such as eggshell nickel catalysts, are known and may be used in industrial processes, including methanation and steam reforming processes. The eggshell catalyst has a thin outer coating layer containing a catalytically active metal such as nickel, supported on an inert refractory metal oxide support.

WO2010125369 discloses a method for preparing an eggshell catalyst comprising the steps of: (i) preparing a calcined shaped calcium aluminate catalyst support, (ii) treating the calcined shaped calcium aluminate support with liquid water, and then drying the support, (iii) impregnating the dried support with a solution containing one or more metal compounds and drying the impregnated support, (iv) calcining the dried impregnated support, to form metal oxide on the surface of the support and (v) optionally repeating steps (ii), (iii) and (iv) on the metal oxide coated support. The method provides an eggshell catalyst in which the metal oxide is concentrated in an outer layer on the support.

WO2012056211 discloses a method for preparing an eggshell nickel catalyst comprising the steps of: (i) impregnating a calcined support comprising a metal aluminate with a solution comprising nickel acetate at a temperature ≥40° C. and drying the impregnated support, (ii) calcining the dried impregnated support, to form nickel oxide on the surface of the support and (iii) optionally repeating steps (i) and (ii) on the nickel oxide coated support. The method provides an eggshell catalyst in which the nickel oxide is concentrated in an outer layer on the support.

The Applicant has developed an alternative method that overcomes problems with the known methods.

DETAILED DESCRIPTION

Figure 1:
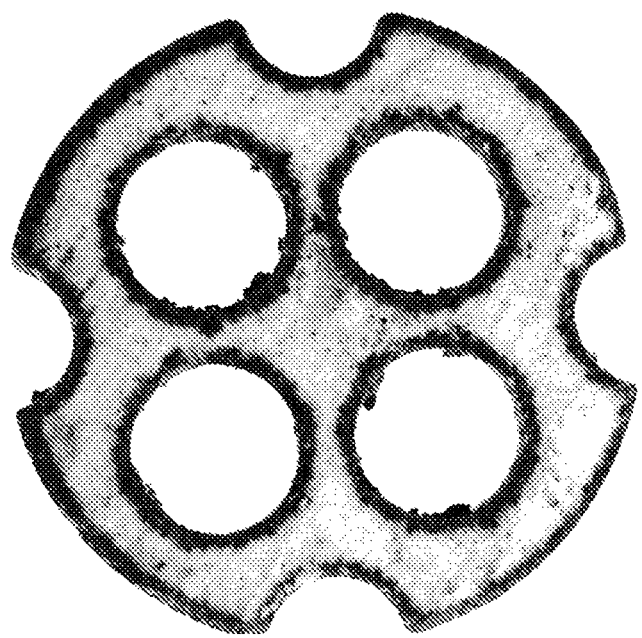
FIG. 1 depicts eggshell catalysts prepared by the method of the present invention.

We have found that by treating the surface of the alkaline earth metal aluminate catalyst support with a humid gas rather than liquid water, the support does not require a drying step and the control of the eggshell thickness may be improved. The method is also flexible, not requiring the use of nickel acetate at a temperature ≥40° C. in order to produce eggshell catalysts.

Accordingly, the invention provides method for preparing an eggshell catalyst comprising the steps of: (i) preparing a calcined shaped alkaline earth metal aluminate catalyst support, (ii) treating the calcined shaped alkaline earth metal aluminate support with a gas containing water vapour to form a hydrated support, (iii) with or without an intervening drying step, impregnating the hydrated support with an acidic solution containing one or more catalytic metal compounds and drying the impregnated support, (iv) calcining the dried impregnated support, to form a calcined catalyst having a catalytic metal oxide concentrated at the surface of the support and (v) optionally repeating steps (ii), (iii) and (iv).

The catalyst prepared by the method is an eggshell catalyst. By the term "eggshell catalyst" we mean that the catalytically active metal or metals are not uniformly distributed within the catalyst support but are concentrated at the surface and therefore form a thin layer, with the metal or metals being absent beneath this layer. The thickness of the eggshell layer is preferably ≤1000 μm, more preferably ≤800 μm, most preferably ≤600 μm. The minimum thickness of the eggshell layer may be 100 μm. The thickness of the layer may readily be established using electron probe microanalysis (EPMA) or optical microscopy on cross-sectioned catalysts.

The shaped catalyst support comprises an alkaline earth metal aluminate. The alkaline earth metal aluminate is a Group II aluminate, preferably magnesium aluminate and/or calcium aluminate. The catalyst support preferably comprises a calcium aluminate cement. By the term "calcium aluminate cement" we include compositions containing one or more calcium aluminate compounds of the formula $nCaO \cdot mAl_2O_3$ where n and m are integers. Examples of such calcium aluminate compounds include calcium monoaluminate ($CaO \cdot Al_2O_3$), tricalcium aluminate ($3CaO \cdot Al_2O_3$), penta calcium trialuminate ($5CaO \cdot 3Al_2O_3$), tricalcium penta aluminate ($3CaO \cdot 5Al_2O_3$), and dodeca calcium hepta aluminate ($12CaO \cdot 7Al_2O_3$). Some calcium aluminate cements, e.g. the so-called "high alumina" cements, may contain alumina in admixture with, dissolved in, or combined with, such calcium aluminate compounds. For example, a well-known commercial high alumina cement has a composition corresponding to about 18% calcium oxide, 79% alumina and 3% water and other oxides. This material has a calcium:aluminium atomic ratio of about 1:5, i.e. $2CaO \cdot 5Al_2O_3$. Calcium aluminate cements are often contaminated with iron compounds, but these are not believed to be detrimental to the present invention. Suitable calcium aluminate cements include the commercially available Ciment Fondu®, and Secar®50, Secar®71, Secar®80 available from Kerneos® and CA-25, CA-14, CA-270 available from Almatis®.

Suitable calcium aluminate cements preferably have a calcium:aluminium atomic ratio within the range 1:3 to 1:12, more preferably 1:3 to 1:10, most preferably 1:4 to 1:8. Where the calcium aluminate cement is a "high alumina" cement, no additional alumina may be necessary but, in general, the support is desirably made from a calcium aluminate cement to which an additional amount of alumina, which may be in the form of a transition alumina, monohydrate or trihydrate, has been added. To accelerate setting, an amount of lime (CaO), e.g. up to 20% by weight of the composition, may also be incorporated into the support composition.

Hence the alkaline earth metal aluminate support preferably comprises a mixture of alumina, one or more calcium aluminate compounds and/or magnesium aluminate, and optionally lime. The calcined shaped alkaline earth metal aluminate support may be prepared by forming a calcium aluminate cement powder and/or a magnesium aluminate powder, optionally with additional alumina and/or lime, into a shape and subsequently calcining the shape Other oxidic materials, e.g. titania, zirconia or lanthana, may be present in the support. While silica may in some cases be incorporated, for use as a steam reforming support, a low silica content, i.e. less than 1% by weight, preferably less than 0.5% by weight, based on the weight of the oxidic material in the support composition is desirable, as silica has an appreciable volatility under steam reforming conditions. The support composition preferably contains ≤25% by weight, more preferably ≤15% by weight, most preferably ≤10% by weight of oxidic material other than alumina, alkaline earth metal oxide or alkaline earth metal aluminate.

A particularly suitable support comprises 30 to 70% by weight of a calcium aluminate cement (comprising 65 to 85% by weight of alumina and 15 to 35% by weight of CaO) mixed with 24 to 48% by weight of alumina, 0 to 20% by weight of lime.

The alkaline earth metal aluminate support is shaped, for example by pelleting, to form particulate shaped units suitable for use in methanation or steam reforming reactors. Processing aids, such as graphite and/or a metal stearate (e.g. Mg or Al stearate), may be incorporated into the composition prior to shaping. Typically, the proportion of graphite is 1 to 5% by weight of the composition. The amounts of metal stearate included may be in the range 0.1 to 2.0% by weight. The composition is desirably shaped into pellets using known pelleting techniques but may also be prepared as extrudates or granules. The length, width and height of such particulate shaped units may be in the range 3-50 mm. The support may be in any suitable shape but preferably the support is in the form of cylinders, which may have one or more through holes. More preferably the shaped support is in the form of a cylindrical pellet having between 1 and 12 holes extending there-through, especially 3-10 holes preferably of circular cross section. The shaped support may have between 2 and 20 flutes or lobes running along the length of the pellet. Suitable diameters for such cylindrical pellets are in the range 4-40 mm and the aspect ratio (length/diameter) is preferably 2. The cylinders may be domed or flat-ended. Preferred shapes include a 4-hole quadralobe, a 5-hole pentalobe, a 7-hole cylinder and a 10-hole cylinder. Particularly preferred shapes are described in WO 2010/029323 A1 and WO 2010/029324 A1.

After shaping, the alkali metal aluminate composition may be cured by adding water, which may contain dissolved alkali metal or alkaline earth metal salts, and the support dried, typically below 200° C. Curing of the composition increases its strength, which is especially desirable when the catalyst is to be used for steam reforming. Curing of the composition take place before and/or during a drying step, e.g. by spraying or immersing the shaped catalyst support with water prior to drying.

The shaped support is a calcined shaped support, i.e. the shaped alkaline earth metal aluminate support has been subjected to a heating step, preferably in the range 400-1400° C. in air or an inert gas, to alter its physiochemical properties before the treatment with humid gas. Calcination is preferably carried out by heating the shaped units to between 500 and 1200° C. in air for between 1 and 16 hours. The catalyst support strength increases, while the porosity and surface area decrease, as the calcination temperature increases. Hence the support calcination should be effected at sufficient temperature to obtain the required mechanical strength but should not be so high that the surface area and porosity are unduly reduced. One or more calcination steps may be used.

The calcined shaped alkaline earth metal aluminate support preferably has a total surface area, as measured by nitrogen absorption, of 0.5 to 40 $m^2g^{-1}$, particularly 1 to 15 $m^2g^{-1}$, and a pore volume of 0.1 to 0.3 $cm^3g^{-1}$, as determined by mercury porosimetry.

Prior to the final calcination, the shaped alkaline earth metal aluminate support may be "alkalised" by impregnation with a solution of an alkali metal compound, such as potassium hydroxide. This serves to minimise lay down of carbon on the catalyst during steam reforming. Alkali oxide, e.g. potash, levels of up to about 5% wt on the calcined support may be used. Similarly, prior to the final calcination, the shaped support may be "activated" by impregnation with a solution of an alkaline earth metal compound, such as calcium nitrate or calcium hydroxide, which is converted into the alkaline earth metal oxide by the calcination. Including an alkaline earth metal compound in this way may be preferable to including lime directly, for example when the alkaline earth metal aluminate is magnesium aluminate.

In the present invention, prior to impregnation with a catalytic metal compound, the calcined shaped alkaline earth metal aluminate support is subjected to a treatment with a gas containing water vapour to form a hydrated support. The gas containing water vapour may have an absolute humidity in the range of 45 to 300 $g/m^3$. Absolute humidity is the measure of water vapor (moisture) in the gas, regardless of temperature. It is expressed as grams of moisture per cubic meter of gas ($g/m^3$). The absolute humidity is preferably $\geq 75$ $g/m^3$, more preferably $\geq 100$ $g/m^3$, most preferably $\geq 150$ $g/m^3$, especially $\geq 200$ $g/m^3$. The humid gas may be nitrogen, air or other suitable gas, but is preferably air. The gas may be humidified using conventional apparatus such as gas saturator or bubbler. The water used to produce the humid gas may be mains water or process water, but desirably has a low level of dissolved salts, preferably below 150 mg/litre. Demineralised water may also be used. The treatment may be at a temperature in the range of 40 to 99° C., preferably 50 to 99° C., more preferably 75 to 99° C. The treatment pressure may be at atmospheric pressure or may be above atmospheric pressure, for example about 1 to 2 bar absolute ($1 \times 10^5$ Pa to $2 \times 10^5$ Pa). The treatment may be applied for 1 hour to 10 days, or longer if desired, although shorter periods in the range of 8-24 hours are preferred. Shorter periods generally require higher absolute humidities and temperatures. It will be understood that treatment below the boiling point of the water will result in the treatment being performed with water vapour.

The relative humidity of the gas containing water vapour is preferably in the range of 60 to 100%. The relative humidity of an air-water mixture is defined as the ratio of the partial pressure of water vapour in air to the saturation vapour pressure of water at the same temperature expressed as a percentage (see for example, Lide, David, 1998, CRC Handbook of Chemistry and Physics (79th ed.), CRC Press, pp. 2-55). The combination of absolute humidity and relative humidity provides a method for providing eggshell catalysts in a particularly effective manner.

A drying step is unnecessary in the present invention. This provides a number of advantages. Moreover, the humid gas treatment is faster and more efficient than a liquid water treatment allowing a faster production rate and removes the need for water-dip tanks and the associated management thereof. If a drying step is performed, it may be achieved in the normal manner, for example by exposing the treated support to a gas, such as dry air or dry nitrogen, to temperature in the range of 50-120° C.

The treated hydrated catalyst support, with or without an intervening drying step, is impregnated with an acidic solution comprising one or more soluble catalytic metal compounds. The acidic impregnation solution preferably comprises one or more transition metals, more preferably one or more transition metals selected from the group consisting of chromium, manganese, nickel, cobalt, iron, copper and zinc. Most preferably, the acidic impregnation solution comprises one or more of nickel, cobalt, iron or copper, especially nickel.

Aqueous impregnation solutions are particularly suitable. The acidic impregnation solution comprises one or more acidic compounds, i.e. compounds that dissolve in water to give acidic solutions (i.e. the impregnation solution desirably has a pH<7.0). Suitable acidic metal compounds include metal nitrate, metal acetate metal citrate and metal oxalate. Where the impregnated metal is nickel, the metal compound used to impregnate the hydrated support is preferably nickel nitrate or nickel acetate.

The concentration of metal in the acidic impregnating solution i.e. the total metal concentration of metal in the acidic impregnation solution, is desirably in the range 100-300 g metal/litre.

Impregnation may be performed at ambient or elevated temperature and at atmospheric or elevated pressure using known techniques, including immersion of the water vapour or steam-treated catalyst support in a metal-containing solution, or by so-called "incipient wetness" impregnation where the volume of solution used equates approximately to the pore volume of the support material. Impregnation of the metal compound at ambient temperature (i.e. 10 to 25° C.), and at atmospheric pressure (about 1 bar abs) may be used, however it has been found that by impregnating the hydrated support at temperatures in the range 40-90° C., improved control over the thickness of the eggshell layer may be obtained.

Following impregnation of the hydrated support with the acidic impregnating solution, the impregnated support is dried and calcined. Drying conditions are suitably at a temperature in the range 25-250° C., preferably in the range 50-150° C. at atmospheric or reduced pressure. Drying times may be in the range 1-24 hours. The calcination step of the dried impregnated support to convert the impregnated catalytic metal compound to the corresponding catalytic metal oxide is preferably performed in air at a temperature in the range 250-850° C. An advantage of the present invention, by virtue of the lower metal content and the increased metal concentration at the surface of the catalysts, is that the amount of nitrogen oxides evolved during calcination of metal nitrate-based precursors can be reduced compared with current catalyst materials.

The catalytic metal content of the resulting catalyst may be controlled in a number of ways, such as the metal content of the solution and the impregnation conditions. In the present invention, because the catalytic metal oxide is concentrated at the surface of the support it is possible to achieve improved catalyst activity with reduced metal loadings. This has clear commercial benefits. The catalytic metal oxide content of the calcined catalyst is preferably in the range 1-25% wt, preferably 1-15% wt, more preferably 1-10% wt. Thus, one impregnation may be sufficient to generate the desired catalyst. However, if desired, impregnation, drying and calcination steps (ii), (iii) and (iv) may be repeated until the catalytic metal oxide content of the calcined catalyst is at the desired level.

Multiple impregnations may be performed using the same or different catalytic metals. If desired, the calcined catalyst may be treated with a gas containing water vapour prior to each catalytic metal impregnation.

The catalytic metal oxide preferably comprises NiO.

The specific surface area of the catalytic metal oxide is suitably in the range 0.1 to 50 $m^2$/g of catalyst.

One or more promoter compounds may be impregnated into the hydrated support, the dried impregnated support and/or the calcined catalyst. Hence one or more promoter compounds may be included in the catalytic metal impregnating solution or the promoter may be added subsequently by a separate impregnation. The promoter may be confined to the eggshell layer or may be distributed throughout the catalyst support. Promoters include platinum group metals such as platinum, palladium, iridium, ruthenium, rhodium and gold. Lanthanide metals such as lanthanum and cerium may also be included as promoters. Water-soluble salts, particularly nitrates, may be used as sources of the metal promoters. More than one promoter may be present and additional alkali may also be added. The amount of promoter metal, if used, will typically be in the range 0.1-5% wt on the calcined catalyst material.

Where the calcined catalyst comprises a reducible metal oxide such as an oxide of Cu, Ni, Co or Fe, the calcined catalyst may be provided to the reactor in which it is to be used in its oxidic form and reduction of the catalytic metal oxide, to form elemental metal, carried out in-situ. For example, the calcined catalyst may be placed in the reactor in which the catalyst is to be used, and the catalytic metal oxide reduced with a reducing agent, such as a hydrogen-containing gas. Known reduction techniques may be used.

Alternatively, the reducible catalytic metal oxide in the calcined catalyst may be reduced ex-situ and then the elemental metal coated with a thin passivating layer of oxide using an oxygen containing gas, such as air or nitrogen-diluted air. A mixture of oxygen and carbon dioxide, optionally with nitrogen, may also be used. In this way the reduced catalyst may be transported safely to the user, and the time to generate the active catalyst and quantity of hydrogen used during the subsequent activation, reduced. This has clear benefits for the user. Therefore, in one embodiment, the method for preparing the catalyst further comprises the steps of reducing a at least a portion of the catalytic metal oxide to elemental form with a hydrogen-containing gas mixture to form a reduced catalyst and subsequently passivating the reduced catalyst, containing metal in elemental form, with an oxygen-containing gas.

The eggshell catalysts prepared according to the invention may be used in steam reforming processes such as primary steam reforming, secondary reforming of a primary reformed gas mixture and pre-reforming. The catalysts may also be used for methanation reactions, hydrogenation reactions and, in oxidic unreduced form, for the decomposition of hypochlorite in aqueous solutions.

The invention is further described by reference to the following Examples.

Example 1. Preparation of a Calcined Catalyst Support (a) Calcium aluminate cement was blended with alumina trihydrate and lime to obtain a mixture with a Ca:Al ratio of 10:56 (molar basis). Graphite (4 wt %) was added, and the resulting mixture pelleted using a tabletting machine to give cylinders of diameter 3.3 mm and length 3.3 mm. The pellets were subjected to water-curing and calcination to obtain a calcined shaped support with the following properties.

BET Surface Area: 4.5 $m^2$/g
Pore volume: 0.24 $cm^3$/g
Density: 1.79 g/cc (b) The method of Example 1(a) was repeated to produce symmetrical 4-hole quadralobe cylindrical pellets as depicted in FIG. 3 of WO2010125369 having a diameter of 13 mm and a length in the range of 16.7-17.3 mm.

BET Surface Area: 4.4 $m^2$/g
Pore volume: 0.23 $cm^3$/g

Example 2. Preparation of Eggshell Ni Catalysts a) Treatment of the calcined catalyst support with water vapour The bottom of a laboratory desiccator (with the desiccant removed) was filled with demineralised water, then a dish containing the calcined shaped calcium aluminate support pellets of Example 1(b) was placed on the mesh above and the desiccator sealed. The desiccator was then placed in an oven set at 55° C. ensuring 100% relative humidity in air at 55° C. for the duration of the treatment. The pellets were treated as follows:

Example 2(a)—1 day (24 hours),

Example 2(b)—3 days

Example 2(c)—7 days b) Impregnation of the hydrated support with Ni nitrate

After treatment, the hydrated supports were, without an intermediate drying step, dipped in 140 g of nickel nitrate solution (approximately 220 g Ni per 1000 ml, pH 1.5) at 80° C. for 20 minutes without stirring, then drained.

c) Calcination to form a calcined catalyst

The impregnated pellets were placed in a furnace and calcined in air with the following program: 100° C./h ramp to 120° C. and dwell for 10 hours, followed by 100° C./h ramp to 640° C. with a 4-hour dwell. Once the furnace had cooled to below 200° C., the samples were removed. All of the samples, Examples 2(a), 2(b), 2(c) had an eggshell layer comprising NiO.

Alternatively, following the treatment with the humid air, portions of each of the treated supports were dried at 120° C. for 17 hours before impregnation. The impregnation and calcination were then performed on the dried samples in the same manner as described above. These examples are marked 2(d), 2(e), and 2(f).

The results are set out in the following table.

| Example | Treatment time (h) | Average eggshell layer thickness (mm) | NiO % wt (loss free, 900° C.) |
|---|---|---|---|
| 2(a) | 24 | 0.587 | Not measured |
| 2(b) | 72 | 0.260 | Not measured |
| 2(c) | 168 | 0.172 | 1.03 |
| 2(d) | 24 | 1.151 | Not measured |
| 2(e) | 72 | 0.274 | Not measured |
| 2(f) | 168 | 0.175 | 0.98 |

The results above suggest that it is not at all necessary to dry the treated catalyst supports in order to obtain an eggshell catalyst. Moreover, the humid gas treatment provided control over the eggshell layer thickness and was able to provide thinner, so more efficient eggshell layers.

Example 3: Preparation of Eggshell Ni Catalysts

Approximately 50 g of the pelleted support of Example 1(a) were weighed into a crucible before being placed in a humidity chamber. The humidity chamber was used to treat the pellets with humid air at specific temperatures and humidities for different durations. Once the treatment was complete, the pellets were removed, then without drying, dipped in aqueous nickel nitrate solution (210 g Ni per 1000 ml, pH 1.5) at 80° C. for 20 minutes without stirring, then separated from the liquid with gentle shaking to remove excess solution. The impregnated pellets were then calcined as set out in Example 2. Once the furnace had cooled to room temperature, the samples were removed and analysed for eggshell thickness and NiO content. The results are set out in the following table.

| Example | Treatment Time (h) | Temperature (° C.) | Relative Humidity (%) | Absolute Humidity (g m$^{-3}$) | Average eggshell layer thickness (mm) | NiO % wt (loss free, 900° C.) |
|---|---|---|---|---|---|---|
| 3(a) A | 12 | 90 | 60 | 251 | 0.659 | 7.47 |
| 3(b) A | 24 | 90 | 60 | 251 | 0.475 | 6.43 |
| 3(c) A | 12 | 70 | 70 | 138 | 0.47 | 6.57 |
| 3(d) A | 12 | 55 | 95 | 98.9 | 0.378 | 5.26 |
| 3(e) A | 12 | 80 | 70 | 205 | 0.368 | 5.17 |
| 3(f) A | 12 | 90 | 60 | 251 | 0.595 | 7.14 |
| 3(g) A | 12 | 40 | 95 | 48.7 | 1.07 | 8.43 |

The Experiment was repeated for the support of Example 1(b).

| Example | Treatment Time (h) | Temperature (° C.) | Relative Humidity (%) | Absolute Humidity (g m$^{-3}$) | Average eggshell layer thickness (mm) | NiO % wt (loss free, 900° C.) |
|---|---|---|---|---|---|---|
| 3(a) B | 12 | 90 | 60 | 251 | 0.709 | 6.77 |
| 3(b) B | 12 | 80 | 70 | 205 | 0.451 | 4.68 |
| 3(c) B | 12 | 90 | 60 | 251 | 0.590 | Not measured |
| 3(d) B* | 12 | 90 | 60 | 251 | 0.712 | Not measured |

*100 g of pellets were used rather than 50 g.

A cross-section of the Example 3(b) B is depicted in FIG. 1.

Figure 2:
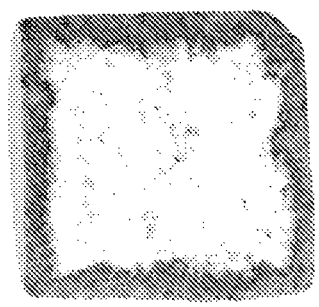
FIG. 2 depects eggshell catalysts prepared by the method of the present invention.

A cross-section of the Example 3(f) A is depicted in FIG. 2.

Both FIGS. 1 and 2 depict eggshell catalysts prepared by the method of the present invention.

Example 4: Testing

The eggshell catalysts of Example 3(b) A and 3(g) A were tested as natural gas steam reforming catalysts. To perform this test, the catalysts were first 'aged' by treating them to a temperature of 750° C. at 28 barg, under a flow of hydrogen and steam (ca. 1:7 molar ratio) for 20 days. They were then cooled, discharged, blended with an alpha alumina grit, then recharged into the natural gas steam reforming test reactor. For the Example 3(b) A test, 20.8 g of catalyst was diluted to 105 cm³ with alpha alumina grit. For the Example 3(g) A test, 22.2 g catalyst was diluted to 105 cm³ with alpha alumina grit. The charges were reduced in a flow of nitrogen (300 NL h$^{-1}$) and hydrogen (300 NL h$^{-1}$) at 600° C., 27 barg for 2 hours. The natural gas steam reforming test then commenced by changing the gas stream to natural gas (1400 NL h$^{-1}$) and steam at a steam to carbon molar ratio of 3.0 at 27 barg. A range of temperatures were tested and the conversion of the ethane component of the natural gas was quantified as a measure of catalyst activity. Ethane conversion is a useful indicator of overall activity as unlike methane conversion, ethane conversion is irreversible.

The results are set out in the following Table:

| Catalyst | Tube wall temperature (° C.) | | | | |
|---|---|---|---|---|---|
| | 800 | 735 | 685 | 610 | 565 |
| Example 3(g) A ethane conversion (%) | 49 | 33 | 25 | 18 | 13 |
| Example 3(b) A ethane conversion (%) | 52 | 38 | 29 | 20 | 14 |

The results show good ethane conversion from both eggshell Ni catalysts in the steam reforming reaction.

The invention claimed is:

1. A method for preparing an eggshell catalyst comprising the steps of: (i) preparing a calcined shaped alkaline earth metal aluminate catalyst support, (ii) treating the calcined shaped alkaline earth metal aluminate catalyst support with a gas containing water vapor to form a hydrated support, (iii) with or without an intervening drying step, impregnating the hydrated support with an acidic solution containing one or more catalytic metal compounds and drying the impregnated support, (iv) calcining the dried impregnated support, to form a calcined catalyst having a catalytic metal oxide concentrated at the surface of the support and (v) optionally repeating steps (ii), (iii) and (iv).

2. The method according to claim 1 wherein the alkaline earth metal aluminate is selected from calcium aluminate, magnesium aluminate and mixtures thereof.

3. The method according to claim 1 wherein the calcined shaped alkaline earth metal aluminate catalyst support is prepared by forming a calcium aluminate cement powder and/or a magnesium aluminate powder, optionally with additional alumina and/or lime, into a shape and subsequently calcining the shape.

4. The method according to claim 3 wherein the calcined shaped alkaline earth metal aluminate catalyst support is alkalised by impregnation with a solution of an alkali metal or an alkaline earth metal prior to a final calcination step.

5. The method according to claim 1 wherein the calcined shaped alkaline earth metal aluminate catalyst support is in the form of a cylindrical pellet having between 1 and 12 holes extending there-though and optionally between 2 and 20 flutes or lobes.

6. The method according to claim 1 wherein the gas containing water vapour is air.

7. The method according to claim 1 wherein the gas containing water vapour has an absolute humidity in the range of 45 to 300 g/m³.

8. The method according to claim 7 wherein the absolute humidity is in the range of 75 to 300 g/m³.

9. The method according to claim 8 wherein the absolute humidity is in the range of 100 to 300 g/m³.

10. The method according to claim 8 wherein the absolute humidity is in the range of 150 to 300 g/m³.

11. The method according to claim 8 wherein the absolute humidity is in the range of 200 to 300 g/m³.

12. The method according to claim 1 wherein the treatment of the calcined shaped alkaline earth metal aluminate catalyst support with the gas containing water vapour is performed at a temperature in the range of 40 to 99° C.

13. The method according to claim 1 wherein the gas containing water vapour has a relative humidity in the range of 60 to 100%.

14. The method according to claim 1 wherein the acidic solution containing one or more catalytic metal compounds comprises one or more transition metals.

15. The method according to claim 1 wherein the metal concentration in the acidic solution containing one or more catalytic metal compounds is in the range 100-300 g metal/litre.

16. The method according to claim 1 wherein the metal impregnation step (iii) is performed at a temperature in the range 40-90° C.

17. The method according to claim 1 wherein the calcined catalyst has a catalytic metal oxide content in the range of from 1 to 25% by weight.

18. The method according to claim 1 wherein one or more promoter compounds are impregnated into the hydrated support, the dried impregnated support and/or the calcined catalyst.

19. The method according to claim 1 wherein the calcination of the dried impregnated support to form the calcined catalyst is performed at a temperature in the range of 250-850° C.

20. The method according to claim 1, wherein the catalytic metal oxide is a reducible metal oxide, further comprising the step of reducing at least a portion of the catalytic metal oxide to elemental form with a hydrogen-containing gas mixture to form a reduced catalyst.

21. The method according to claim 20 further comprising a step of passivating the reduced catalyst, containing metal in elemental form with an oxygen-containing gas.

22. The method according to claim 1 wherein the acidic solution containing one or more catalytic metal compounds comprises one or more of chromium, manganese, nickel, cobalt, iron, copper or zinc.

23. The method according to claim 1 wherein the acidic solution containing one or more catalytic metal compounds comprises one or more of nickel, cobalt, iron or copper.

24. The method according to claim 1 wherein the acidic solution containing one or more catalytic metal compounds comprises nickel.

* * * * *